(12) United States Patent
Cho

(10) Patent No.: US 8,576,682 B2
(45) Date of Patent: Nov. 5, 2013

(54) METHOD AND APPARATUS FOR PREVENTING DATA REPRODUCIBILITY

(75) Inventor: Won Ik Cho, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 279 days.

(21) Appl. No.: 12/484,534

(22) Filed: Jun. 15, 2009

(65) Prior Publication Data

US 2010/0020659 A1    Jan. 28, 2010

(30) Foreign Application Priority Data

Jul. 22, 2008  (KR) .................. 10-2008-0071232

(51) Int. Cl.
*G11B 19/04*    (2006.01)
(52) U.S. Cl.
USPC ............... 369/53.2; 369/13.04; 369/30.04; 369/111
(58) Field of Classification Search
USPC ............... 369/53.2, 13.04, 30.04, 111
See application file for complete search history.

(56) References Cited

U.S. PATENT DOCUMENTS

| | | | | |
|---|---|---|---|---|
| 5,956,311 | A * | 9/1999 | Kawai | 369/100 |
| 7,843,785 | B2 * | 11/2010 | Nishioka et al. | 369/53.2 |
| 2005/0125355 | A1 * | 6/2005 | Fein | 705/57 |
| 2005/0169122 | A1 * | 8/2005 | Haga | 369/30.27 |
| 2006/0203631 | A1 * | 9/2006 | Wu et al. | 369/44.26 |
| 2007/0047395 | A1 * | 3/2007 | Skeeter et al. | 369/30.04 |
| 2008/0130477 | A1 * | 6/2008 | Kim et al. | 369/292 |
| 2008/0298216 | A1 * | 12/2008 | Liao | 369/116 |

FOREIGN PATENT DOCUMENTS

| | | |
|---|---|---|
| JP | 10-214424 | 8/1998 |
| JP | 2001-014681 | 1/2001 |
| JP | 2003-038650 | 10/2003 |
| KR | 100767168 B1 | 10/2007 |

OTHER PUBLICATIONS

Korean Office Action issued on Jan. 15, 2010, in corresponding Korean Application No. 10-2008-0071232 (3 pages).

* cited by examiner

*Primary Examiner* — Joseph Feild
*Assistant Examiner* — Linh N Hoffner
(74) *Attorney, Agent, or Firm* — NSIP Law

(57) ABSTRACT

Provided are a method and an apparatus to prevent reproducibility of data with respect to an optical information storage medium. The method includes recording patterns with respect to the optical information storage medium using irradiated light so as prevent reproduction of the data. The patterns may cause an error or a malfunction when attempting to access the data of the optical information storage medium so as to prevent the reproduction of the data.

28 Claims, 14 Drawing Sheets

METHOD AND APPARATUS FOR PREVENTING DATA REPRODUCIBILITY

CROSS-REFERENCE TO RELATED PATENT APPLICATION(S)

This application claims the benefit under 35 U.S.C. §119(a) of a Korean Patent Application No. 10-2008-0071232, filed on Jul. 22, 2008, in the Korean Intellectual Property Office, the disclosure of which is incorporated herein in its entirety by reference.

TECHNICAL FIELD

The following description relates to a method and an apparatus for preventing data reproducibility, and more particularly, to a method and apparatus for preventing data reproducibility of an optical information storage medium.

BACKGROUND

Optical information storage media are widely used to record data such as audio, image, graphics data, and the like. Examples of optical information storage media include compact discs (CDs), digital versatile discs (DVDs), high definition (HD)-DVDs, Blue-ray discs (BDs), etc.

A variety of types of data can be stored in such an optical information storage media. However, data stored in optical information storage media may need to be destroyed or prevented from being reproducible upon a user request. For example, confidential data such as financial data, accounts data, privileged information, and the like may be stored in an optical information storage medium and but may also need to be destroyed so that no one can reproduce the data again.

As an illustration, in a conventional magnetic information storage device such as a hard disc drive, a strong external magnetic field may be placed close to a portion of the disc having data recorded thereon, so that original magnetic patterns written on that portion of the disc are changed into other patterns or are degaussed. Accordingly, data stored in the portion of the disc cannot be reproduced again.

However, to destroy data or prevent the data stored in an optical information storage medium from reproduced again, a method of breaking the optical information storage medium using a shredder or a method of scratching the surface of the optical information storage medium using a sharp probe have been suggested. In these conventional methods, additional breaking or scratching equipment is needed. Moreover, such methods may result in pulverized powders of the optical information storage medium, or a user may be hurt by a sharp portion of a piece from among pieces resulting from shredding or breaking of the optical information storage medium.

As another method, a method of introducing a malfunction with respect to reproducibility of original data recorded on an optical information storage medium by overwriting another data of discretionary patterns on the original data has been suggested. In such a method, reproducibility of data stored on an optical information storage medium becomes erroneous and additional breaking equipment is not needed. However, in such a method, a recording track is followed in order to overwrite the discretionary information. As such, when a problem occurs in relation to a tracking servo, data cannot be erased properly, and even if a normal tracking servo operation can be performed, it takes much time to erase the data. For example, in a DVD recordable (DVD-R) disc having an 18× speed, it takes about 6 minutes to erase the original data by overwriting discretionary information on the original data.

SUMMARY

According to one general aspect, there is provided an apparatus to prevent reproducibility of data with respect to an optical information storage medium, the apparatus including an optical pickup to irradiate light to record patterns with respect to the optical information storage medium so as to prevent reproduction of the data of the optical information storage medium, and a controller to control the optical pickup so as to record at least part of the patterns not following a recording track of the optical information storage medium.

The controller may control the optical pickup to record a pattern that intersects at least one recording track of the optical information storage medium.

The controller may control the optical pickup so as to control only a focusing servo operation of the optical pickup during the recording of the patterns.

The controller may control the optical pickup so that the optical pickup makes a reciprocating motion between inner and outer circumferences of the optical information storage medium to record the patterns.

The controller may control the optical pickup so as to record the patterns in a predetermined region of the optical information storage medium.

The predetermined region may be a region having a table of contents area of the optical information storage medium.

The predetermined region may be a region of a user data region of the optical information storage medium having the data.

The controller may control the optical pickup so that the optical pickup vibrates in a cross-track direction and makes a reciprocating motion between inner and outer circumferences of the optical information storage medium to record the patterns.

The controller may control the optical pickup so that a power of the light irradiated by the optical pickup to record the patterns is equal to or greater than a recording power to record the data.

The patterns may be recorded on the optical information storage medium using pulse signals or continuous signals.

The controller may control the optical pickup so that a phase difference $\alpha$ is $n\alpha \neq 360°$, where the phase difference $\alpha$ is a phase difference that occurs while the optical pickup makes a reciprocating motion between inner and outer circumferences of the optical information storage medium once and n is a positive integer.

The controller may control the optical pickup so that, when a difference between the phase difference $\alpha$ and a remainder angle $\beta$ is an angular difference $\delta$, the phase difference $\alpha$ is not a multiple of the angular difference $\delta$, wherein the remainder angle $\beta$ is obtained by dividing 360° by the phase difference $\alpha$.

According to another general aspect, there is provided an apparatus to prevent reproducibility of data with respect to an optical information storage medium, the apparatus including an optical pickup to irradiate light to record patterns with respect to the optical information storage medium so as to prevent reproduction of the data of the optical information storage medium, and a controller to control the optical pickup so as to record at least part of the patterns not using an additional tracking servo operation of the optical pickup.

According to still another aspect, there is provided an apparatus to prevent reproducibility of data with respect to an optical information storage medium, the apparatus including an optical pickup to irradiate light to record patterns with respect to the optical information storage medium so as to prevent reproduction of the data of the optical information storage medium, and a controller to control the optical pickup so as to record at least part of the patterns in a reciprocating motion between inner and outer circumferences of the optical information storage medium.

According to yet another aspect, there is provided a method of preventing reproducibility of data with respect to an optical information storage medium, the method including recording patterns with respect to the optical information storage medium using irradiated light so as to prevent reproduction of the data of the optical information storage medium, wherein at least part of the patterns is recorded according to one of not following a recording track of the optical information storage medium, not using an additional tracking servo operation, and in a reciprocating motion between inner and outer circumferences of the optical information storage medium.

The recording of the pattern may include recording a pattern that intersects at least one recording track of the optical information storage medium.

The recording of the patterns may include recording the patterns using only a focusing servo operation.

The recording of the patterns may include recording the patterns in a reciprocating motion between inner and outer circumferences of the optical information storage medium.

The recording of the pattern may include recording the patterns in a predetermined region of the optical information storage medium.

The predetermined region may be a region having a table of contents area of the optical information storage medium.

The predetermined region may be a region of a user data region of the optical information storage medium having the data.

The method may further include receiving an input corresponding to a selection of recording the patterns to one of all regions of the optical information storage medium and a predetermined region of the optical information storage medium.

The recording of the patterns may include recording the patterns in a cross-track direction and in a reciprocating motion between inner and outer circumferences of the optical information storage medium.

The method may further include reading a validity period of the data, wherein the recording of the patterns comprises recording the patterns in response to the validity period being exceeded or expired.

The method may further include receiving an input corresponding to the number of patterns, wherein different numbers represent different level of preventions, and the recording of the patterns comprises recording the patterns according to the input.

Other features and aspects will be apparent from the following detailed description, the drawings, and the claims.

Figure 1:
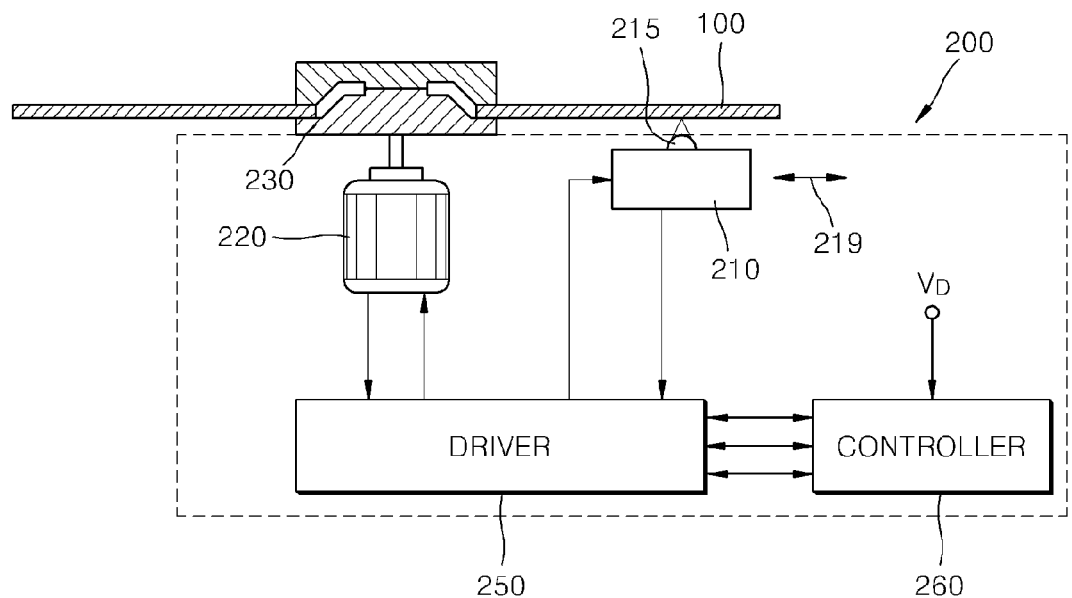
FIG. 1 is a diagram illustrating a schematic structure of an exemplary apparatus to prevent reproducibility of data with respect to an optical information storage medium.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a schematic structure of an exemplary apparatus 200 to prevent reproducibility of data with respect to an optical information storage medium 100. The apparatus 200 includes a spindle motor 220 which rotates the optical information storage medium 100, an optical pickup 210 which is installed to move in a radial direction 219 of the optical information storage medium 100 and reproduces and/or writes information from and/or on the optical information storage medium 100, a driver 250 which drives the spindle motor 220 and the optical pickup 210, and a controller 260 which controls a focusing servo operation of the optical pickup 210 and a process of preventing reproducibility of data with respect to the optical information storage medium 100. Here, reference numeral 230 denotes a turn table on which the optical information storage medium 100 is placed.

The optical information storage medium 100 may be, for example, a recordable optical information storage medium such as a compact disc (CD), a digital versatile disc (DVD), a high definition (HD)-DVD, a Blue-ray disc (BD), and the like.

The optical pickup 210 may be an optical pickup that is generally employed in an optical disc drive. In the optical pickup 210, light that is irradiated on the optical information storage medium 100 and is reflected from the optical information storage medium 100 is detected by using an optical detector (not shown) disposed in the optical pickup 210 and is photoelectrically transformed and changed into an electrical signal, and the electrical signal is input to the controller 260 by using the driver 250. The driver 250 controls the rotation speed of the spindle motor 220, amplifies the input signal, and drives the optical pickup 210.

The controller 260 may control a process of preventing reproducibility of data with respect to the optical information storage medium 100, for example, by permanently introducing traces to cause malfunctioning of data reproducibility, by using a predetermined program with or without user intervention.

For example, information regarding a data validity period recorded on the optical information storage medium 100 may be read by the optical pickup 210 and when it is determined that the validity period of data recorded on the optical information storage medium 100 has exceeded or expired, the controller 260 may control the apparatus 200 to perform the process of preventing reproducibility of the data by using the predetermined program automatically or without user's intervention. The process may be performed in the overall regions of the optical information storage medium 100, a predetermined region, or only in a region in which the data having the expired validity period is recorded.

As another example, the controller 260 may control the apparatus 200 to perform the process according to a user intervention. In this case, a level for preventing reproducibility of data or for permanently introducing malfunctioning of data reproducibility may be determined by the user, as well as a region in which the process is performed.

The controller 260 may control the apparatus 200 to write predetermined patterns on the optical information storage medium 100 without performing an additional tracking servo operation. In addition, during the process, the controller 260 may control the optical pickup 210 so that a power of light irradiated on the optical information storage medium 100 is equal to or greater than a recording power. For example, the predetermined pattern may be continuous patterns or discontinuous patterns such as pulse, and may or may not be data stored in a memory, for example, it may be a discretionary signal.

The apparatus 200 may be substantially the same as a known optical disc drive except that the controller 260 controls the apparatus 200 to perform the process preventing reproducibility of data.

Figure 2:
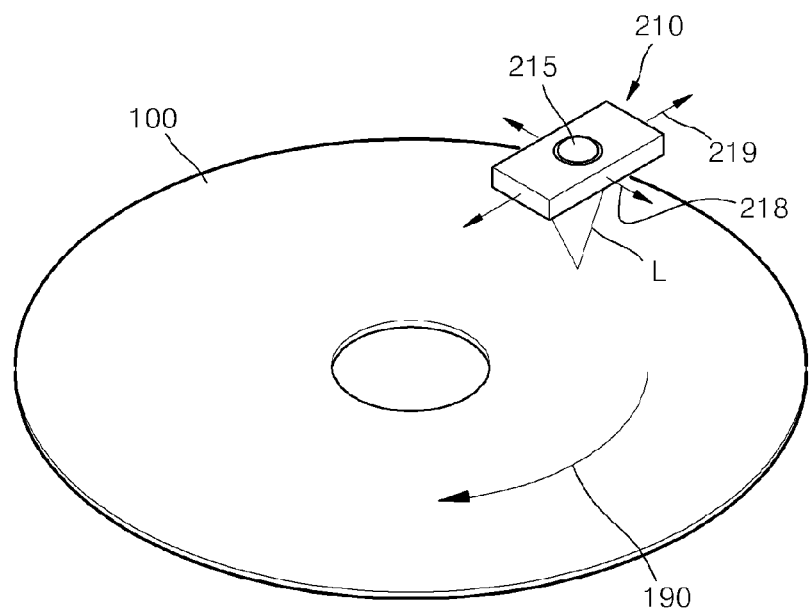
FIG. 2 is a schematic diagram illustrating driving of the apparatus of FIG. 1.
Figure 3:
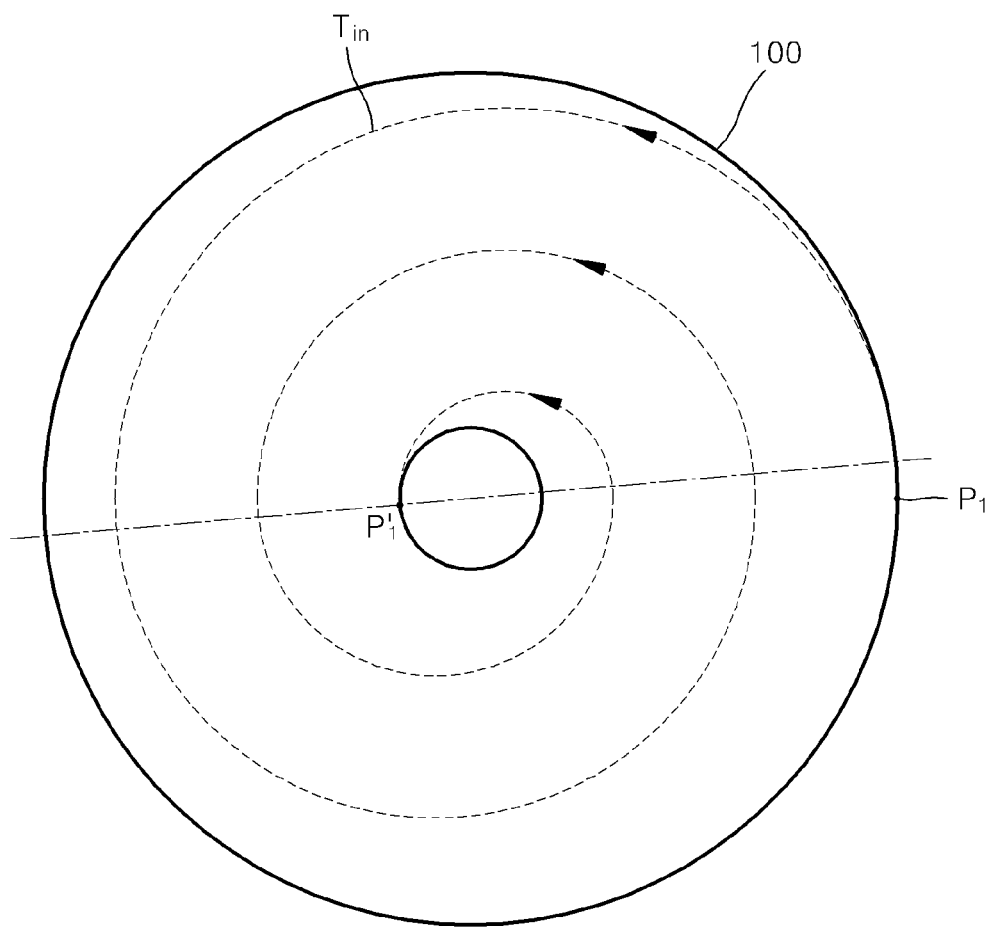
FIGS. 3 through 5 are diagrams illustrating an exemplary process of re-recording traces on an optical information storage medium by an optical pickup of an apparatus to prevent reproducibility of data with respect to the optical information storage medium.
Figure 4:
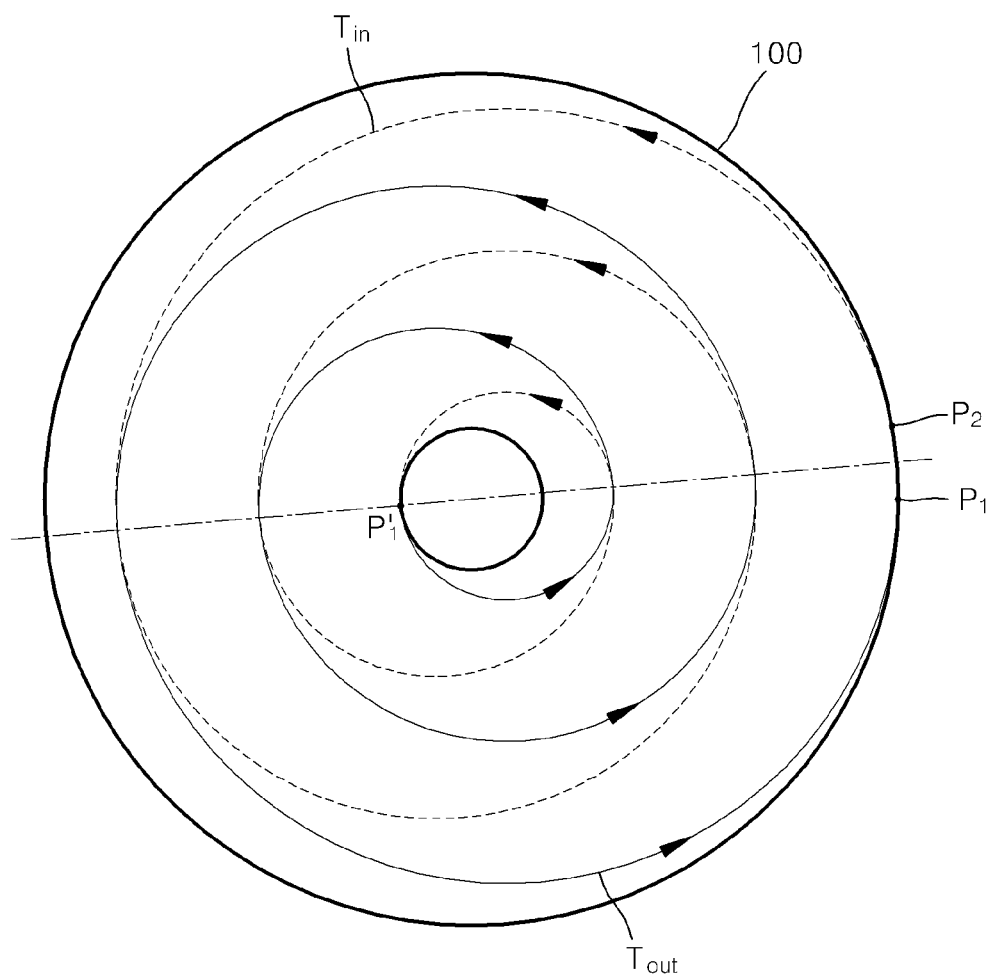
Figure 5:
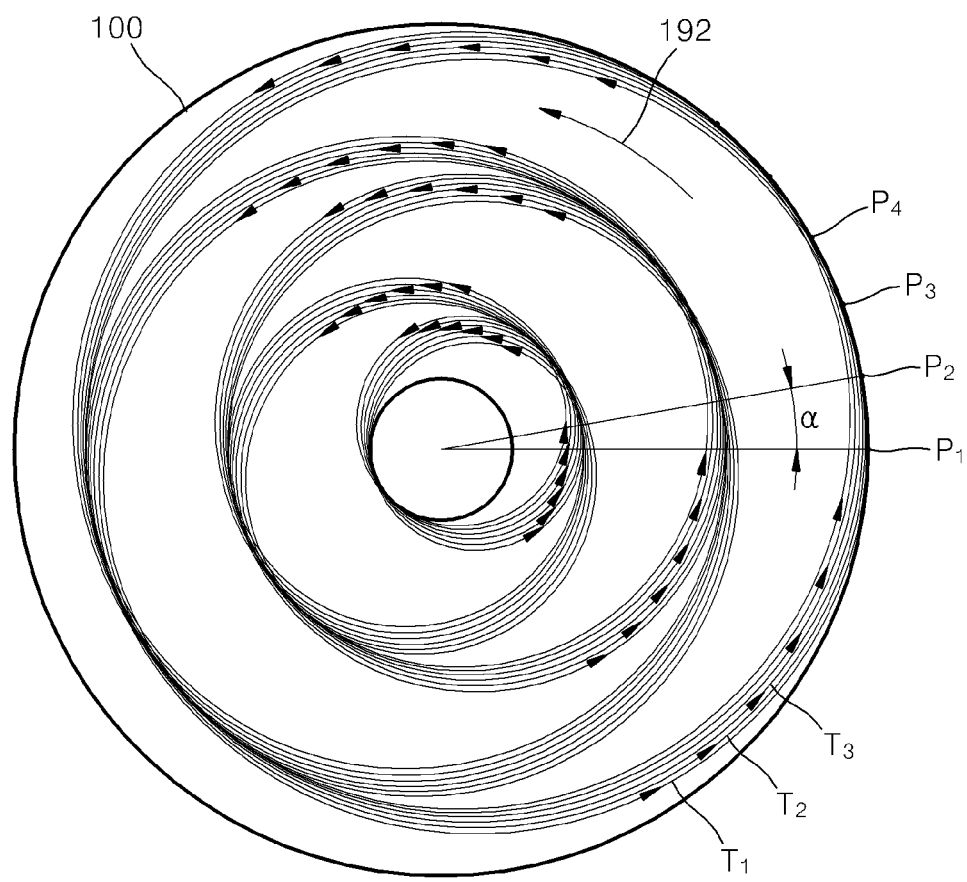
Figure 6:
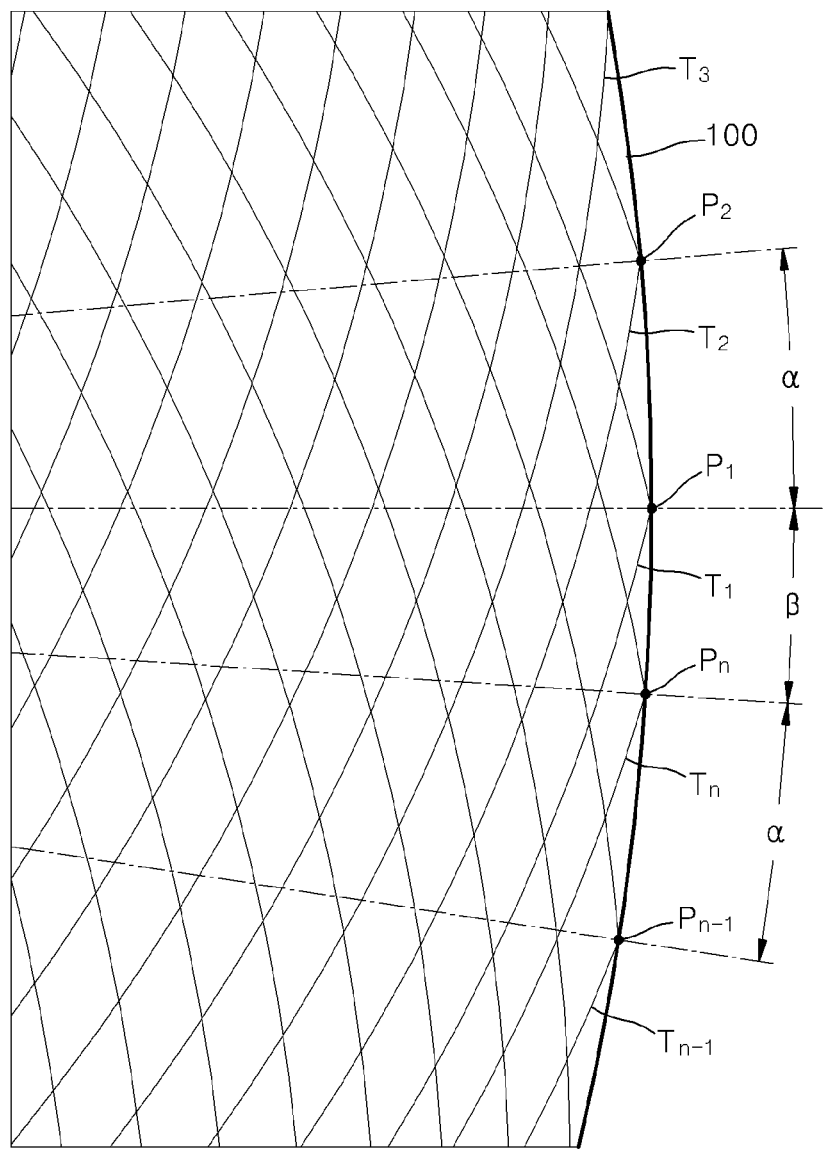
FIG. 6 is a diagram illustrating an enlarged view of a portion of an outer region of the optical information storage medium shown in FIG. 5.
Figure 7:
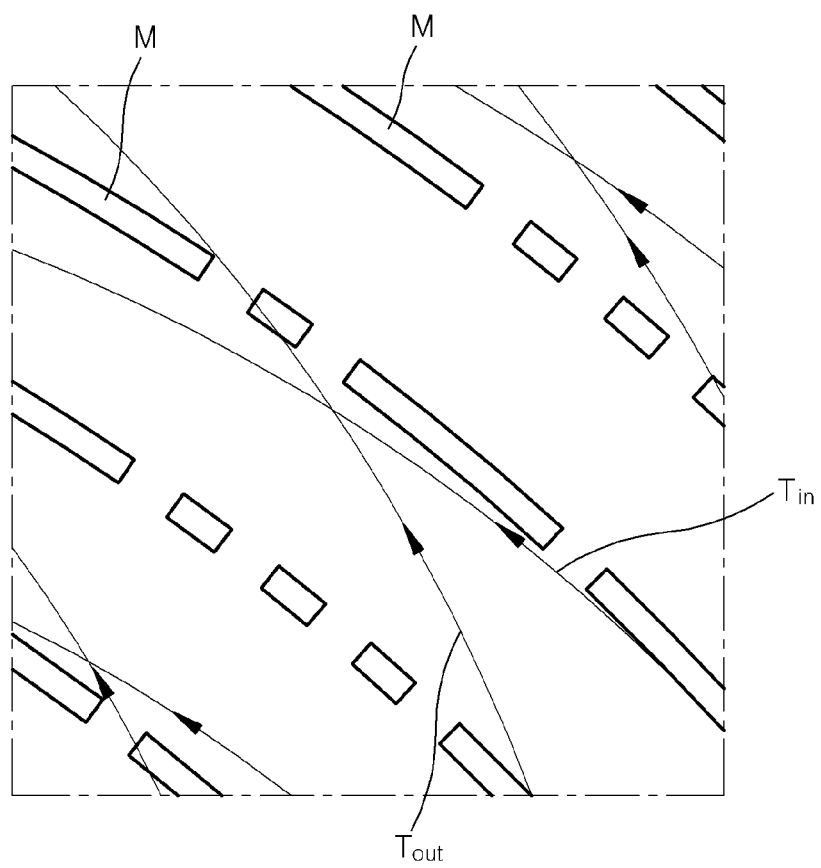
FIG. 7 is a diagram illustrating an enlarged view of a portion of a region in which traces of the optical information storage medium shown in FIG. 5 cross.
Figure 8:
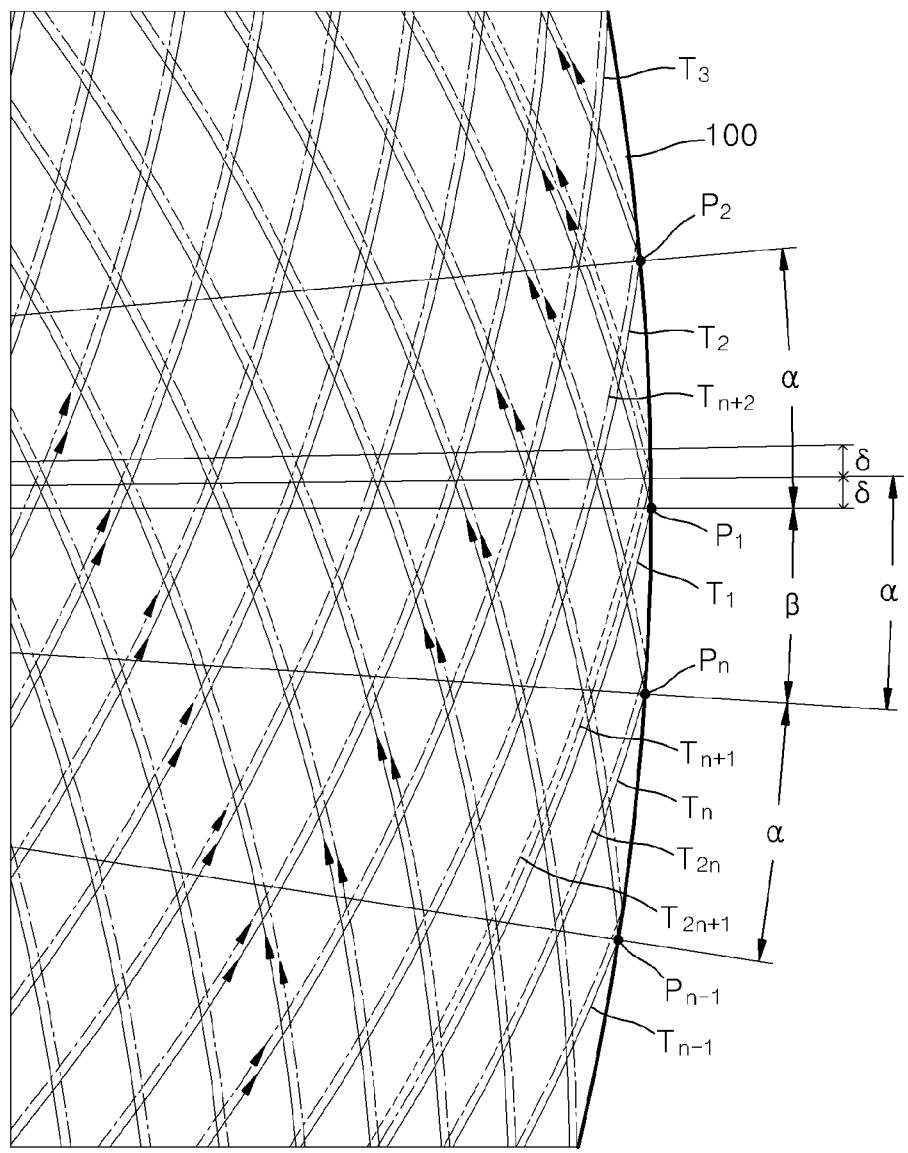
FIG. 8 a diagram illustrating a case where the number of re-recording traces formed on an optical information storage medium is increased.

FIG. 2 illustrates driving of the apparatus 200 of FIG. 1, and FIGS. 3 through 5 sequentially illustrate an exemplary process of re-recording traces on an optical information storage medium to prevent reproducibility of data with respect to the optical information storage medium. Re-recording of the traces refers to recording traces after or over original data so that reproduction of the original data is prevented. FIG. 6 is an enlarged view of a portion of an outer region of the optical information storage medium shown in FIG. 5, and FIG. 7 is an enlarged view of a portion of a region in which traces of the optical information storage medium shown in FIG. 5 cross. FIG. 8 illustrates a case where the number of traces is increased.

An exemplary operation of the apparatus 200 for preventing reproducibility of data with respect to an optical information storage medium will be described further with reference to FIGS. 2 through 8.

Referring to FIG. 2, the optical pickup 210 irradiates light L on the optical information storage medium 100 through an objective lens 215. While the process of introducing patterns is performed, the irradiated light L does not need to follow a track that has been already formed on the optical information storage medium 100. A focusing servo operation may be performed so that the irradiated light L forms a focus on a recording layer (not shown) of the optical information storage medium 100. Where the process is performed only in a predetermined region of the optical information storage medium 100, a tracking servo operation may also be performed so as to check the position of the region. While the process is performed, the optical pickup 210 may write the patterns while making a reciprocating motion in a diameter direction 219 in all regions or between partial sections of the optical information storage medium 100.

An example in which the process of introducing the patterns is performed in all region of the optical information storage medium 100 will be described with reference to FIGS. 3 through 8.

Referring to FIG. 3, the optical pickup 210 starts from a starting point $P_1$ of an outermost circumference of the optical information storage medium 100, proceeds toward the inward of the diameter direction 219 (see FIG. 2), and reaches a destination point $P_1'$ of an innermost circumference of the optical information storage medium 100. It is understood that a starting point and a destination point may vary. The optical information storage medium 100 rotates, for example, clockwise 190 (see FIG. 2) while the optical pickup 210 proceeds inwards. Thus, an inward trace $T_{in}$ draws a spiral form counterclockwise, as illustrated in FIG. 3. The destination point $P_1'$ is slightly out of line with the starting point $P_1$ so that the following traces do not overlap one another, as will be further described below.

FIG. 3 illustrates a case where the optical information storage medium 100 rotates at constant angular velocity (CAV). However, this is only exemplary and the process is not limited thereto. In another implementation, for example, the optical information storage medium 100 may rotate at constant linear velocity (CLV) or partial constant angular velocity (PCAV) or zoned constant linear velocity (ZCLV).

When the optical pickup 210 reaches the innermost circumference of the optical information storage medium 100, the optical pickup 210 starts from the destination point $P_1'$ of the innermost circumference of the optical information storage medium 100 again and proceeds towards the outside of the diameter direction 219. The optical information storage medium 100 rotates, for example, clockwise 190 while the optical pickup 210 proceeds outwards. Thus, an outward trace $T_{out}$ draws a spiral form counterclockwise, as illustrated in FIG. 4.

The position of the optical pickup 210 when reaching the innermost circumference of the optical information storage medium 100, may be slightly distant from a line connecting the starting point P1 of the outermost circumference of the optical information storage medium 100 and the center of the optical information storage medium 100. Similarly, a destination point $P_2$ when the optical pickup 210 reaches the outermost circumference of the optical information storage medium 100, may be slightly out of line with the starting point $P_1$.

FIG. 4 illustrates traces $T_{in}$ and $T_{out}$ which are drawn by the optical pickup 210 while making a reciprocating motion once.

FIG. 5 illustrates traces T1, T2, T3 . . . which are formed while the optical pickup 210 makes a reciprocating motion a plurality of times. Referring to FIG. 5, inward traces are shown as arrows in a counterclockwise direction starting from an outermost circumference of the optical information storage medium 100 and outward traces are shown as arrows in the counterclockwise direction ending towards the outermost circumference of the optical information storage medium 100. An inward trace and an outward trace represent, for example, a trace $T_1$.

Referring to FIG. 5, each of the traces $T_1, T_2, T_3, \ldots$ is formed whenever the optical pickup 210 makes a reciprocating motion once. In other words, when the optical pickup 210 makes a reciprocating motion a plurality of times, starting points of the traces $T_1, T_2, T_3, \ldots$ are mapped to $P_1, P_2, P_3, \ldots$, and the traces $T_1, T_2, T_3, \ldots$ are formed in a direction 192. The reciprocating motion of the optical pickup 210 may be performed for a predetermined number of times to cover all regions of the optical information storage medium 100 at least once. For example, the optical pickup 100 may perform a reciprocating motion repeatedly until $P_1, P_2,$ and $P_3$, which are the starting points of the traces $T_1, T_2, T_3, \ldots$, are spaced out around the outermost circumference of the optical information storage medium 100 at least once. As such, the traces $T_1, T_2, T_3, \ldots$ may cross one another in all regions, as illustrated in FIGS. 5 and 6.

An angular interval of the starting points $P_1, P_2,$ and $P_3$ of the traces $T_1, T_2, T_3, \ldots$ corresponds to a phase difference that occurs between a reciprocating motion period of the optical pickup 210 and a rotation period of the optical information storage medium 100. The angular interval of the starting points $P_1, P_2,$ and $P_3$ of the traces $T_1, T_2, T_3, \ldots$ may be indicated as $\alpha$. Since the rotation period of the optical information storage medium 100 is generally higher than the reciprocating motion period of the optical pickup 210, the phase difference $\alpha$ represents an angle at which the optical information storage medium 100 rotates and is displaced from its right position while the optical pickup 210 makes a reciprocating motion once. In this case, the right position means an angular position at which the optical information storage medium 100 rotates by a multiple of 360-degree.

Referring to FIG. 6, where the number of reciprocating motions of the optical pickup 210 made while the optical pickup 210 rotates the outermost circumference of the optical information storage medium 100 of FIG. 5 once, is n, the phase difference $\alpha$ may be obtained by Equation 1 below.

$$360 = n\alpha + \beta \quad (1),$$

where n is a positive integer, $\beta$ is a remainder in which 360-degree is divided by the phase difference $\alpha$, and a remainder angle $\beta$ is a positive integer that is smaller than $\alpha$. When the remainder angle $\beta$ is not 0, n traces may be formed due to the reciprocating motion of the optical pickup 210, as illustrated in FIG. 8. When the remainder angle $\beta$ is 0-degees, even though the optical pickup 210 makes reciprocating motions n or more times repeatedly, traces formed by the process are not added anymore.

In the exemplary implementation, the optical pickup 210 starts from the starting point $P_1$ of the outermost circumference of the optical information storage medium 100. However, in other implementations, the optical pickup 210 may start from a discretionary point within the optical information storage medium 100 and may make, for example, a reciprocating motion in the diameter direction 219 that is inward and outward of the optical information storage medium 100.

FIG. 7 illustrates a relationship between a recording track of the optical information storage medium 100 and an exemplary reciprocating motion of the optical pickup 210. As illustrated in FIG. 7, a trace is formed at an angle to a recording track M, irrespective of the recording track M, on the optical information storage medium 100. When discretionary data is re-recorded on the optical information storage medium 100 by using the trace, the data is not recorded while following the recording track M and because of the trace, error signals occur when attempts to reproduce data from the recording track M are made. The error signals satisfy predetermined conditions so that an optical disc drive can determine that data of an optical information storage medium is not reproducible or readable. For example, when signals 1 and 0 within a block are +1 and −1, respectively, a signal sum within the block, i.e., a digital sum value, is not 0, and reproduction of the data of the optical information storage medium is not realized. As another example, recording marks formed at the beginning and end of each block may be synchronized by using a longest period T. When the synchronization disappears or the longest period T is increased, a DC level is increased and a phase locked loop (PLL) is fixed and accordingly, reproduction of the data may not be realized. Further, where a block Error Rate (bER) exceeds an allowable level, reproduction of the data may not be realized. Further, where the error signals within the block are adjacent to one another, reproduction of the data may not be realized. When the error signals are not corrected in an error correction code (ECC) block, reproduction of the data may not be realized.

The exemplary apparatus 200 described above need not perform an additional tracking servo operation to prevent reproducibility of data. The discretionary data may be recorded irrespective of the recording track M, and by generating error signals that may cause the above-mentioned exemplary conditions, reproduction of the data is prevented.

Typically, there are standard errors associated with reproducibility of recorded data in an optical information storage medium. For example, standard values of errors that are used to determine reproducibility may include C1 and C2 errors for a CD and PI and PO errors for a DVD. For example, the PI and PO errors relate to the number of errors that are generated in a block which is one recording unit within the optical information storage medium. When an error of 1 or more bytes exists in a row of an ECC block, there is 1 PI error. A standard value of the PI error corresponds to a value before ECC that is equal to or less than 280 per continuous 8 ECC blocks. When the value before ECC exceeds 280 per continuous 8 ECC blocks, i.e., when a PI-8 value is 1664, the optical information storage medium having such a PI error cannot be read. Thus, when the optical information storage medium is a DVD, for example, patterns to permanently malfunction data reproducibility may be introduced and error signals may be generated so that the PI-8 value can be equal to or greater than 1664.

In the exemplary implementation, discretionary data is recorded irrespective of the recording track which is being secured, as illustrated in FIG. 7, and at least bER or more error signals are generated, thereby making data recorded on the optical information storage medium 100 unreadable.

Traces formed by the optical pickup 210 should be densely formed without overlapping, as further described below, so that at least bER or more error signals can be generated. FIG. 8 illustrates a case where the number of traces is increased. Referring to FIG. 8, where a remainder angle $\beta$ is not 0 in the above Equation 1 and the optical pickup 210 makes a reciprocating motion more than n times, new traces $T_{n+1}, T_{n+2}, T_{n+3}, \ldots, T_{2n-1}, T_{2n}, \ldots$ are formed in the state where the optical pickup 210 is slightly out of phase with the existing traces $T_1, T_2, T_3, \ldots, T_{n-1}, T_n$. In this case, an angular difference $\beta$ between the existing traces $T_1, T_2, T_3, \ldots, T_{n-1}, T_n$ and the new traces $T_{n+1}, T_{n+2}, T_{n+3}, \ldots, T_{2n-1}, T_{2n}, \ldots$ may be obtained by using Equation 2 below.

$$\delta = \alpha - \beta \quad (2)$$

In this case, when the phase difference α is not a multiple of the angular difference δ, the added traces $T_{n+1}$, $T_{n+2}$, $T_{n+3}$, ..., $T_{2n-1}$, $T_{2n}$, ... fill a gap between the existing traces $T_1, T_2, T_3, \ldots, T_{n-1}, T_n$ without overlapping, as illustrated in FIG. 8, and data that is recorded according to the above effectively cause at least bER or more error signals that are necessary to inhibit reproduction of the optical information storage medium 100. For example, when the phase difference α and the remainder angle β are relatively prime, the phase difference α may not be a multiple of the angular difference δ.

Thus, the traces $T_1$, $T_2$, $T_3$, . . . may be formed without overlapping.

Figure 9:
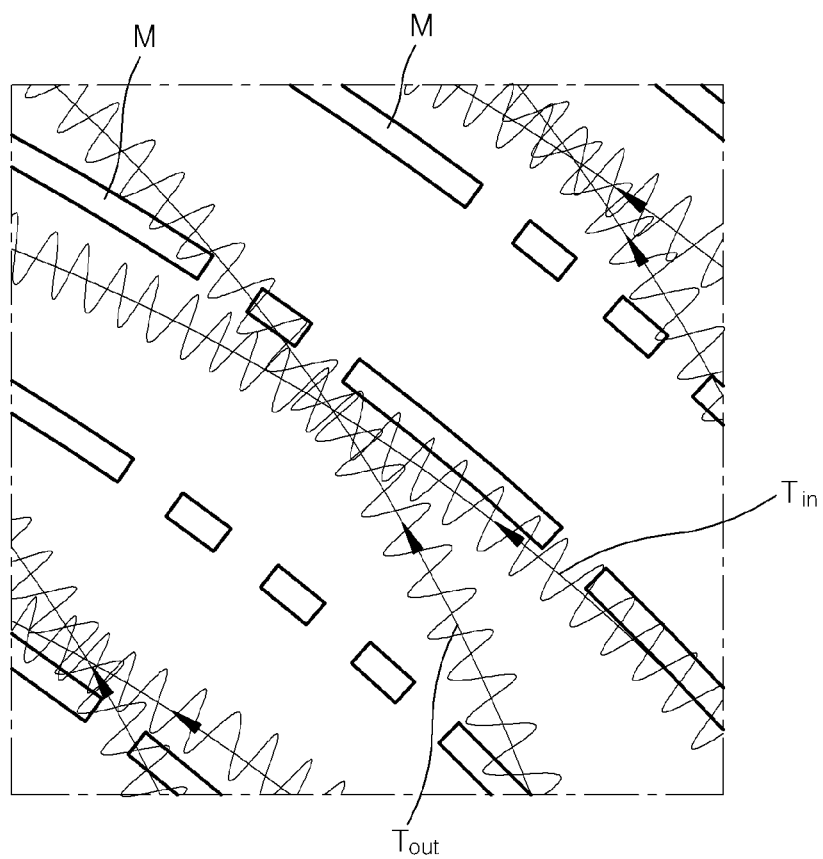
FIG. 9 a diagram illustrating another example of traces formed on an optical information storage medium.

FIG. 9 illustrates another example of traces formed on an optical information storage medium to prevent reproduction of data with respect to the optical information storage medium.

Referring to FIG. 9, an optical pickup (see, for example, 210 of FIG. 2) is controlled by a controller (see, for example, 260 of FIG. 1) so that the optical pickup vibrates in a cross-track direction (i.e., the diameter direction 219 of FIG. 2) and makes a reciprocating motion between the inner and outer circumferences of the optical information storage medium 100. In this case, as illustrated in FIG. 9, traces $T_{in}$ and $T_{out}$ that are formed while the optical pickup makes a reciprocating motion, are more widely distributed than the case shown in FIG. 7. Thus, signals for generating errors can be more easily recorded on a recording mark M. This implementation is substantially the same as the implementation discussed with reference to FIGS. 1 through 8 except that the optical pickup vibrates in the cross-track direction and thus, further description will be omitted for conciseness.

Figure 10:
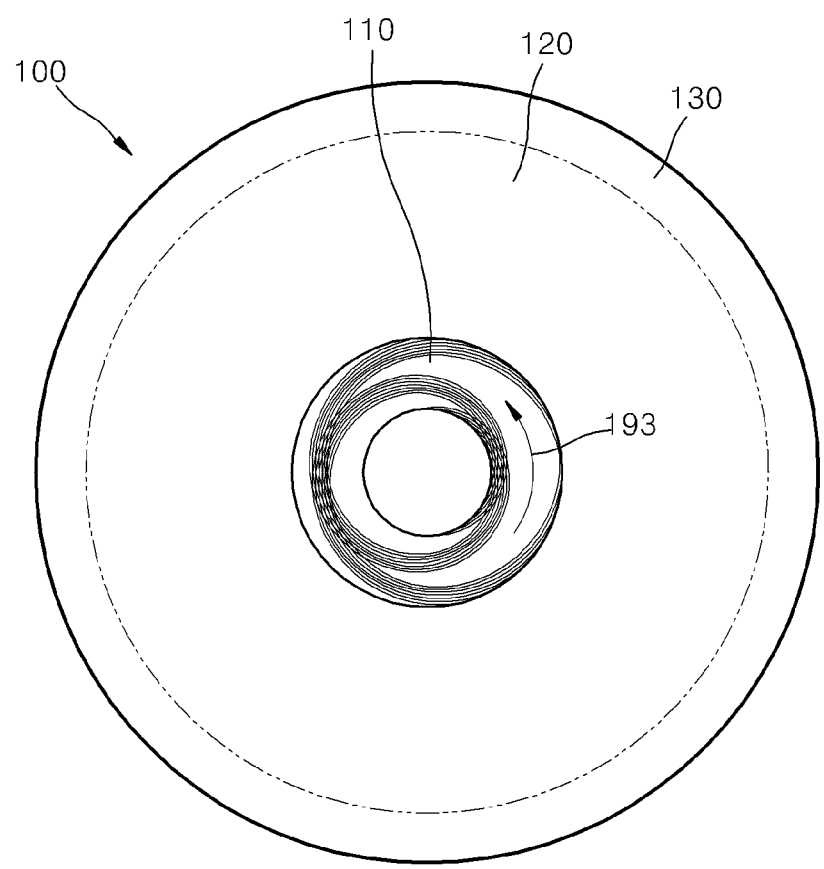
FIG. 10 is a diagram illustrating still another example of traces formed on an optical information storage medium.

FIG. 10 illustrates still another example of traces formed on an optical information storage medium 100 to prevent reproduction of data with respect to the optical information storage medium 100.

Referring to FIG. 10, traces to generate error signals may be formed only in a partial region of the optical information storage medium 100. In this implementation, a process of introducing the traces is performed in a table of contents (TOC) area in which contents information is recorded. The optical information storage medium 100 may include a lead-in region 110, a user data region 120, and a lead-out region 130. Generally, the TOC area is recorded in the lead-in region 110. Thus, when such is the case, an optical pickup (see, for example, 210 of FIG. 1) makes a reciprocating motion between the inner and outer circumferences of the lead-in region 110 of the optical information storage medium 100 repeatedly and forms the traces, so as to generate error signals that inhibit data reproducibility with respect to the lead-in region 110. By introducing the traces only in the lead-in region 110, a process of preventing reproducibility of data with respect to the optical information storage medium 100 may be completed at faster speed as compared to introducing traces to all regions of the optical information storage medium 100. The case where the process of introducing the traces is performed only in a region including the TOC area may be referred to as a fast mode. The case described with respect to, for example, FIGS. 3 to 5 takes a longer time, and may be referred to as a slow mode.

Figure 11:
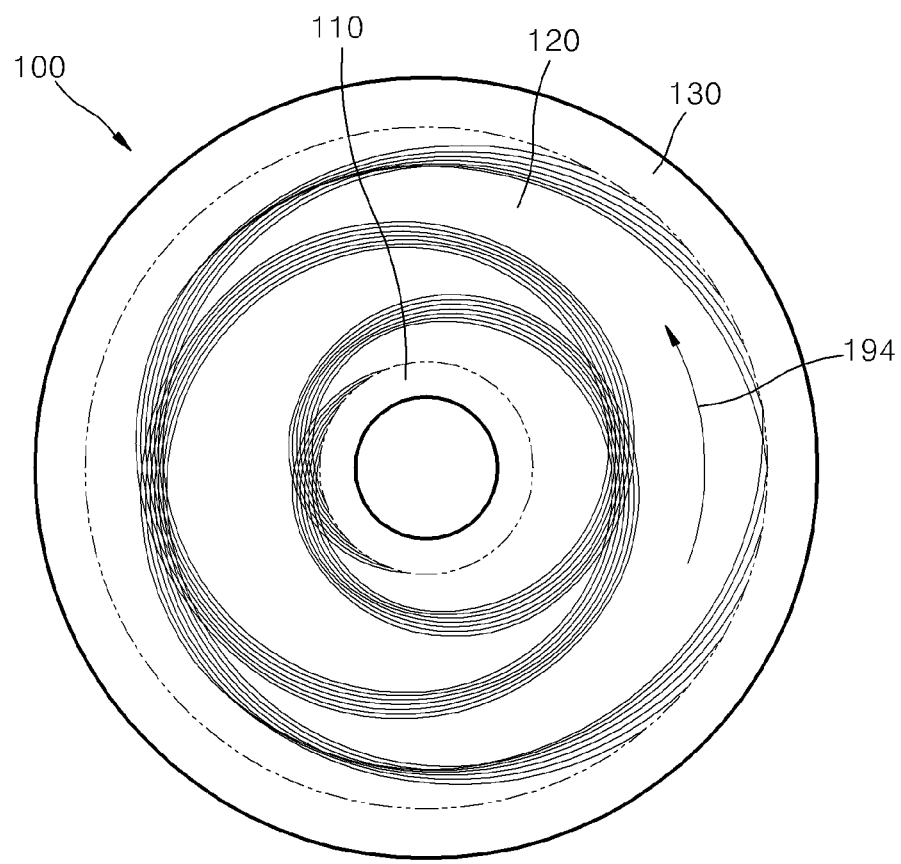
FIG. 11 is a diagram illustrating yet another example of traces formed on an optical information storage medium.

FIG. 11 illustrates yet another example of traces formed on an optical information storage medium 100 to prevent reproduction of data with respect to the optical information storage medium 100.

Referring to FIG. 11, traces to generate error signals may be formed only in a partial region of the optical information storage medium 100. In this implementation, a process of introducing the traces is performed in a user data region in which data or contents to be prevented from being accessed again are recorded. The optical information storage medium 100 may include a lead-in region 110, a user data region 120, and a lead-out region 130. Since the process of introducing patterns to cause malfunctioning of data reproducibility is performed in the user data region 120, it may take a longer time than the fast mode. However, the patterns can be introduced in a shorter time than the slow mode because the process is performed with respect to a partial region of the optical information storage medium 100.

Figure 12:
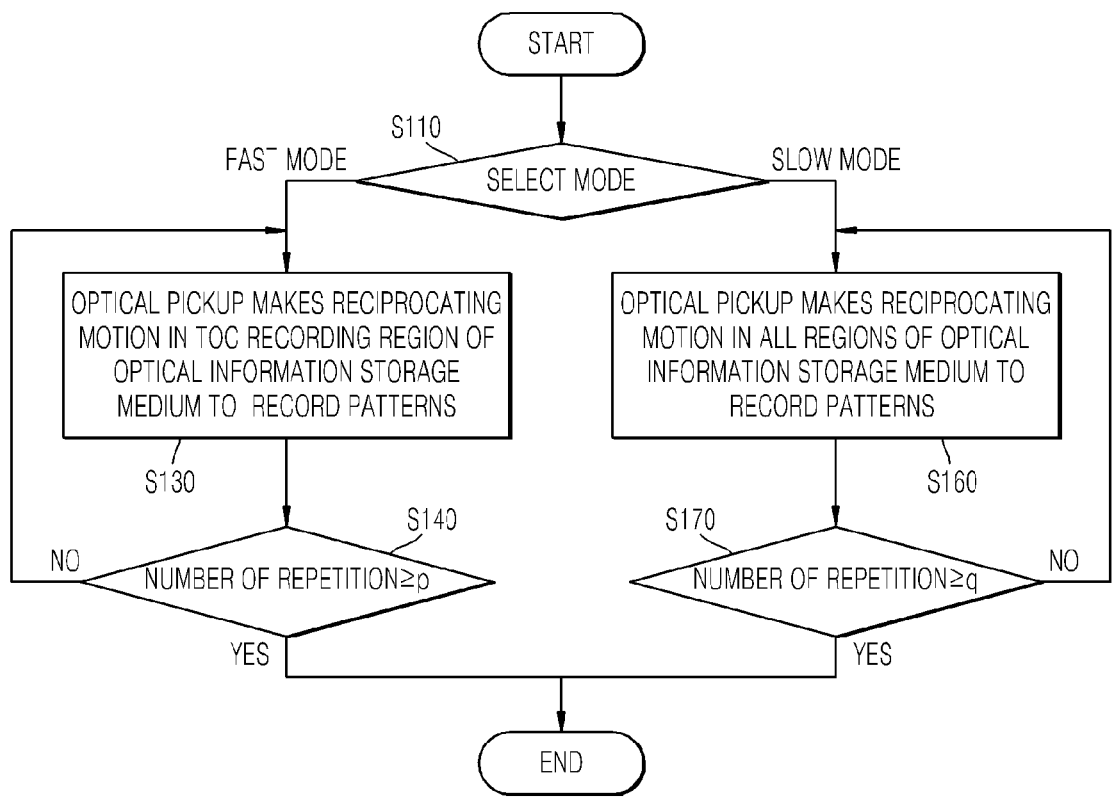
FIG. 12 is a flowchart illustrating an exemplary method of preventing reproducibility of data with respect to an optical information storage medium.

FIG. 12 shows a flowchart illustrating an exemplary method of preventing reproducibility of data with respect to an optical information storage medium. The method may be performed by, for example, the apparatus of FIG. 1. Referring to FIG. 12, an input is received corresponding to a user's selection of a mode, for example, a fast mode or a slow mode, in operation S110. Where the input corresponds to the fast mode, an optical pickup makes a reciprocating motion in a TOC area of an optical information storage medium and records patterns in operation S130. When the number of repetitions does not exceed a predetermined reference value p in operation S140, the method proceeds with the operation of recording patterns, and when the number of repetitions exceeds the reference value p in operation S140, the process is ended. Meanwhile, where the input corresponds to the slow mode, the optical pickup makes a reciprocating motion in the entire region of the optical information storage medium and records patterns in operation S160. When the number of repetition does not exceed a predetermined reference value q in operation S170, the method proceeds with the operation of recording patterns, and when the number of repetitions exceeds the reference value q in operation S170, the process is ended.

The predetermined reference values p and q may be set by, for example, a manufacturer, and various levels of introducing patterns may be set. When the predetermined reference values p and q are large values, the optical pickup generates a large number of traces so that the reliability of introducing malfunction to data reproducibility is improved. On the other hand, when the predetermined reference values p and q are smaller, the reliability of introducing malfunction to data reproducibility may be lower while the process introducing the patterns may be completed in a shorter time. For example, in relation to the PI error of DVD described above, generally, when the PI error value per continuous 8 ECC blocks exceeds 900, almost all data reproducibility or readability malfunctions. Thus, if the reference value of PI-8 of 1664 is a very strict reference, the reference value of PI-8 of 900 will be a slightly less strict reference at which patterns may be introduced to cause malfunctioning of data reproducibility. Accordingly, where various levels of the reference values p and q are provided, a user may select a desired level for introducing the patterns to prevent reproducibility of data with respect to the optical information storage medium.

Figure 13:
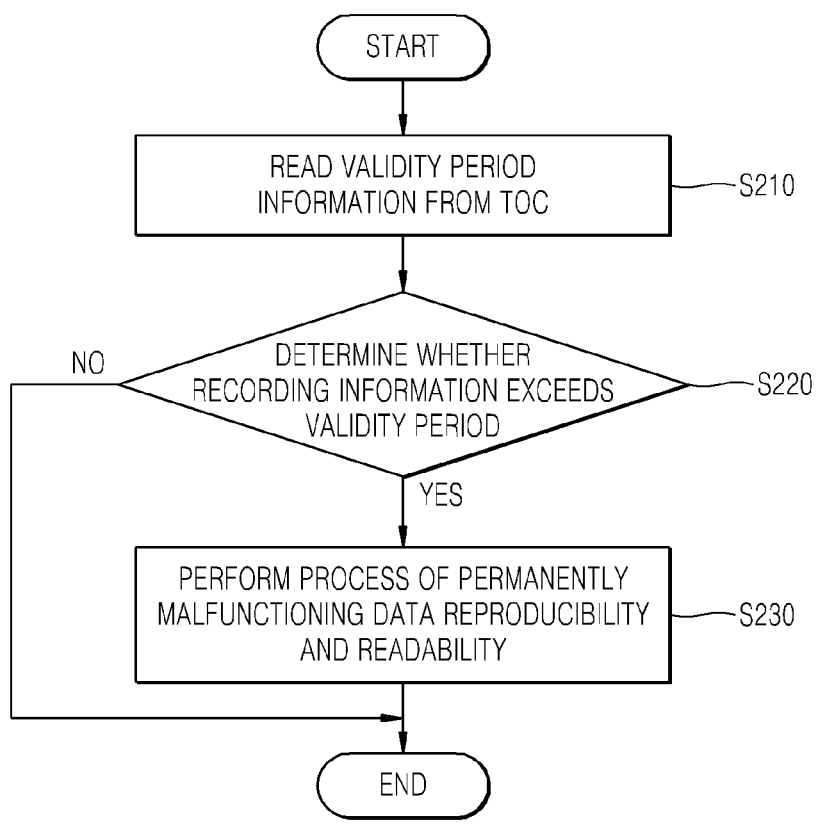
FIG. 13 is a flowchart illustrating another exemplary method of preventing reproducibility of data with respect to an optical information storage medium.

FIG. 13 shows a flowchart illustrating another method of preventing reproducibility of data with respect to an optical information storage medium. The method may be performed by, for example, the apparatus of FIG. 1 Referring to FIG. 13, when an optical information storage medium is inserted into the apparatus, the apparatus reads disc information containing validity period information from, for example, a TOC area in operation S210. The apparatus determines whether recording information exceeds a validity period in operation S220. When the recording information exceeds the validity period, the process introducing patterns to cause malfunctioning of data reproducibility is performed in operation S230. When the recording information does not exceed the validity period, the method is ended. Here, the operation S230 may be performed automatically without a user's intervention, or the method may further comprise an operation of asking for the user's confirmation prior to performing the operation S230. In the method, when recording information having a validity period exceeds its validity period, the recording information may be destroyed by the method so that the recording information is prevented from being accessed again.

Figure 14A:
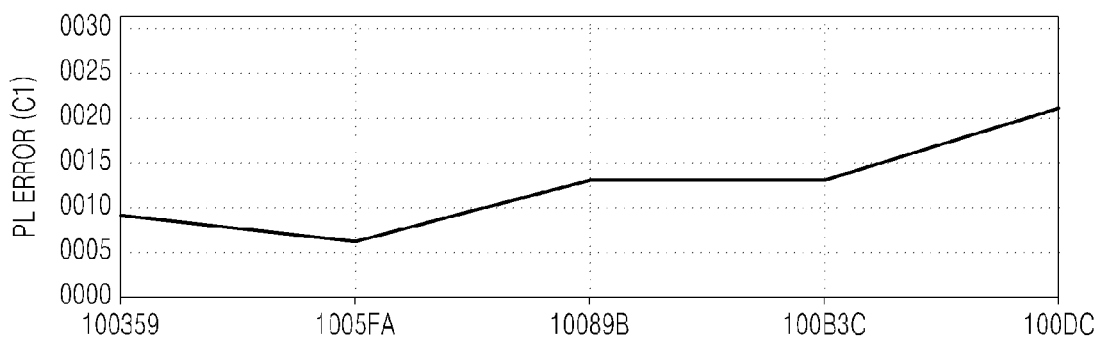
FIGS. 14A and 14B are graphs showing PI errors in a DVD-R optical disc having data recorded thereon.
Figure 14B:
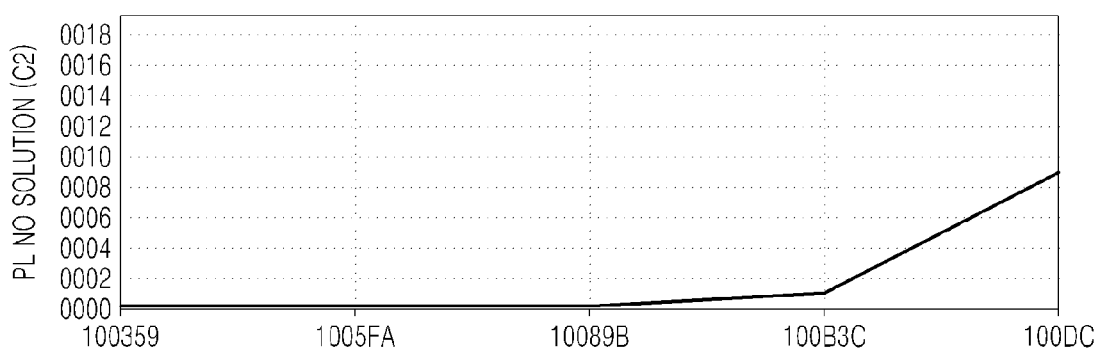
Figure 15A:
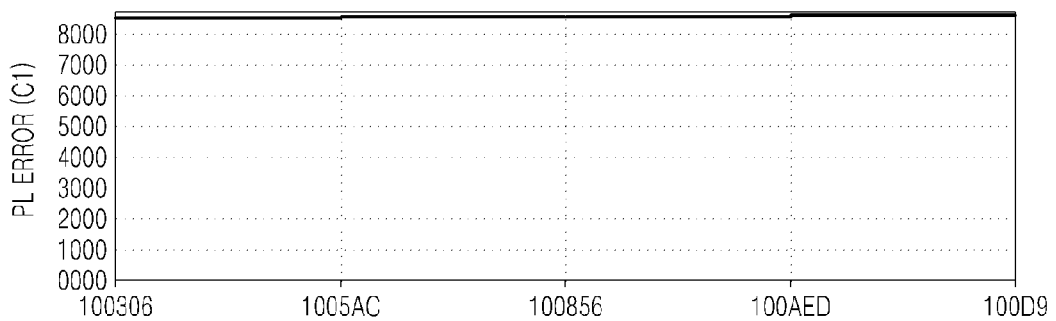
FIGS. 15A and 15B are graphs showing PI errors in the DVD-R optical disc having the data recorded thereon, after an exemplary method of preventing reproducibility of data is performed with respect to the DVD-R optical disc.
Figure 15B:
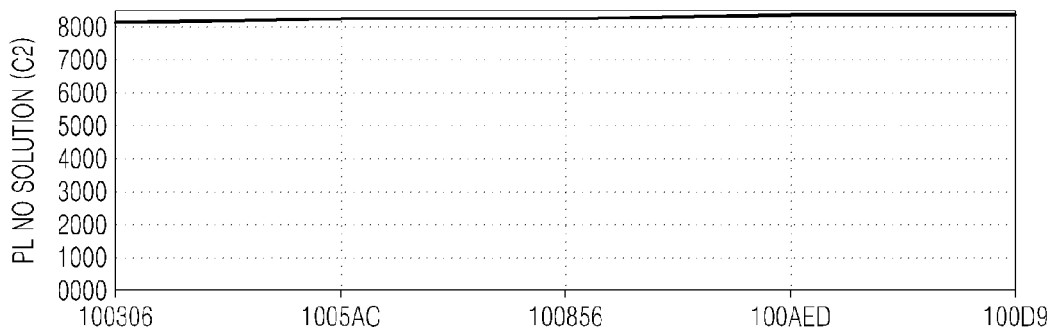

FIGS. 14A and 14B show graphs illustrating PI errors in a DVD-R optical disc having data recorded thereon, and FIGS. 15A and 15B show graphs illustrating PI errors in the DVD-R optical discs having data recorded, after a process of, for example, permanently introducing patterns to cause malfunctioning of data reproducibility is performed. For example, an optical pickup vibrates on the DVD-R optical disc having data recorded, at a vibration width of 80 μm and makes a reciprocating motion from the inner circumference to the outer circumference of the DVD-R optical disc, and performs a re-recording operation to introduce the patterns.

Referring to FIGS. 14A and 14B, the DVD-R optical disc before the process of introducing the patterns, does not have PI errors related to CI errors and C2 errors and/or has a good recording quality within an allowable limit. Referring to FIGS. 15A and 15B, after the process of introducing the patterns, PI errors increase rapidly to an unallowable limit and data reproducibility or readability is not achieved.

According to certain example(s) described above, a method and an apparatus are provided which introduces patterns or traces, for example, by re-recording permanently over an existing data or a TOC area, to prevent the existing data from being accessed again, for example, the patterns or traces causing an error or a malfunction during an attempt to reproduce or read the existing data. Accordingly, additional equipment may not be needed and the method and apparatus may be easily implemented while reducing a processing time of the method. The method and apparatus may be utilized to prevent reproducibility of data with respect to an optical information storage medium such a CD, DVD, BD, and the like.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus to prevent reproducibility of data with respect to an optical information storage medium, the apparatus comprising:
   an optical pickup to irradiate light to record patterns with respect to the optical information storage medium so as to prevent reproduction of the data of the optical information storage medium; and
   a controller to control the optical pickup so as to record at least part of the patterns by repeatedly moving the optical pickup a plurality of times between inner and outer circumferences of the information storage medium while not following a recording track of the optical information storage medium to generate a predetermined spiral recording pattern on the information storage medium,
   wherein the controller controls the optical pickup to create a phase difference.

2. The apparatus of claim 1, wherein the controller controls the optical pickup to record a pattern that intersects at least one recording track of the optical information storage medium.

3. The apparatus of claim 1, wherein the controller controls the optical pickup so as to control only a focusing servo operation of the optical pickup during the recording of the patterns.

4. The apparatus of claim 1, wherein the controller controls the optical pickup so that the optical pickup makes a reciprocating motion between inner and outer circumferences of the optical information storage medium to record the patterns.

5. The apparatus of claim 1, wherein the controller controls the optical pickup so as to record the patterns in a predetermined region of the optical information storage medium.

6. The apparatus of claim 5, wherein the predetermined region is a region having a table of contents area of the optical information storage medium.

7. The apparatus of claim 5, wherein the predetermined region is a region of a user data region of the optical information storage medium having the data.

8. The apparatus of claim 1, wherein the controller controls the optical pickup so that the optical pickup vibrates in a cross-track direction and makes a reciprocating motion between inner and outer circumferences of the optical information storage medium to record the patterns.

9. The apparatus of claim 1, wherein the controller controls the optical pickup so that a power of the light irradiated by the optical pickup to record the patterns is equal to or greater than a recording power to record the data.

10. The apparatus of claim 1, wherein the patterns are recorded on the optical information storage medium using pulse signals or continuous signals.

11. The apparatus of claim 1, wherein the controller controls the optical pickup so that the phase difference is described by the following equation:

$$n\alpha \neq 360°,$$

wherein α comprises the phase difference that occurs while the optical pickup makes a reciprocating motion between inner and outer circumferences of the optical information storage medium once, and n comprises a positive integer.

12. The apparatus of claim 11, wherein the controller controls the optical pickup so that, when a difference between the phase difference α and a remainder angle β is an angular difference δ, the phase difference α is not a multiple of the angular difference δ, wherein the remainder angle β is obtained by dividing 360° by the phase difference α.

13. An apparatus to prevent reproducibility of data with respect to an optical information storage medium, the apparatus comprising:
 an optical pickup to irradiate light to record patterns with respect to the optical information storage medium so as to prevent reproduction of the data of the optical information storage medium; and
 a controller to control the optical pickup so as to record at least part of the patterns by repeatedly moving the optical pickup a plurality of times between inner and outer circumferences of the information storage medium while not using an additional tracking servo operation of the optical pickup to generate a predetermined recording pattern of non-concentric circles on the information storage medium,
 wherein the controller controls the optical pickup to create a phase difference.

14. An apparatus to prevent reproducibility of data with respect to an optical information storage medium, the apparatus comprising:
 an optical pickup to irradiate light to record patterns with respect to the optical information storage medium so as to prevent reproduction of the data of the optical information storage medium; and
 a controller to control the optical pickup so as to record at least part of the patterns in a reciprocating motion between inner and outer circumferences of the optical information storage medium by repeatedly moving the optical pickup a plurality of times between the inner and outer circumferences of the information storage medium while not following a recording track of the optical information storage medium to generate a predetermined spiral recording pattern on the information storage medium,
 wherein the controller controls the optical pickup to create a phase difference.

15. A method of preventing reproducibility of data with respect to an optical information storage medium, the method comprising:
 recording patterns with respect to the optical information storage medium using irradiated light so as to prevent reproduction of the data of the optical information storage medium,
 wherein at least part of the patterns is recorded by an optical pickup in a reciprocating motion between inner and outer circumferences of the optical information storage medium by repeatedly moving the optical pickup a plurality of times between the inner and outer circumferences of the information storage medium while not following a recording track of the optical information storage medium to generate a predetermined spiral recording pattern on the information storage medium.

16. The method of claim 15, wherein the recording of the pattern comprises recording a pattern that intersects at least one recording track of the optical information storage medium.

17. The method of claim 15, wherein the recording of the patterns comprises recording the patterns using only a focusing servo operation.

18. The method of claim 15, wherein the recording of the patterns comprises recording the patterns in a reciprocating motion between inner and outer circumferences of the optical information storage medium.

19. The method of claim 15, wherein the recording of the pattern comprises recording the patterns in a predetermined region of the optical information storage medium.

20. The method of claim 19, wherein the predetermined region is a region having a table of contents area of the optical information storage medium.

21. The method of claim 19, wherein the predetermined region is a region of a user data region of the optical information storage medium having the data.

22. The method of claim 13, further comprising receiving an input corresponding to a selection of recording the patterns to one of all regions of the optical information storage medium and a predetermined region of the optical information storage medium.

23. The method of claim 15, wherein the recording of the patterns comprises recording the patterns in a cross-track direction and in a reciprocating motion between inner and outer circumferences of the optical information storage medium.

24. The method of claim 15, further comprising reading a validity period of the data, wherein the recording of the patterns comprises recording the patterns in response to the validity period being exceeded or expired.

25. The method of claim 15, further comprising receiving an input corresponding to the number of patterns, wherein:
 different numbers represent different level of preventions, and
 the recording of the patterns comprises recording the patterns according to the input.

26. The apparatus of claim 1, wherein the phase difference occurs between a reciprocating motion period of the optical pickup, and a rotational period of the optical storage medium.

27. The apparatus of claim 1, wherein the controller controls the optical pickup to record the at least part of the patterns by controlling the optical pickup to move from an outermost circumference of the optical information storage medium toward an innermost circumference of the optical storage medium, or to move from the innermost circumference of the optical storage medium toward the outermost circumference of the optical information storage medium, so as to record a spiral-shaped pattern.

28. The apparatus of claim 1, wherein the phase difference comprises an angular interval between one of a first starting point or a first destination point of a first pattern of the patterns, and one of a second destination point or a second starting point of a second patterns.

* * * * *